Patented Apr. 15, 1952

2,592,682

UNITED STATES PATENT OFFICE 2,592,682

ORGANO SILOXANES AND THEIR PRODUCTION

John T. Goodwin, Jr., Pittsburgh, Pa., assignor to Dow Corning Corporation, Midland, Mich., a corporation of Michigan No Drawing. Application April 20, 1948, Serial No. 22,257. In Great Britain July 1, 1947

6 Claims. (Cl. 260—448.2)

The present invention relates to the production of polymeric organosilicon compositions in which the silicon atoms are variously linked by methylene radicals and by oxygen atoms.

In the history of the organosilicon compounds, two principal types of compounds containing more than one silicon atom have heretofore been described. In one of these types, the silicon atoms are linked directly to each other. These are the so-called polysilanes, heretofore described by Kipping. The present organosilicon industry is based upon the siloxanes, which are materials in which the silicon atoms are linked through oxygen atoms. There has been some mention in the literature heretofore of organosilicon halides containing a plurality of silicon atoms in which the silicon atoms are linked by large divalent organic radicals and the remaining valences of the silicon atoms are satisfied by chlorine.

In my application, Serial No. 22,254, now Patent No. 2,507,513, filed simultaneously herewith, I have disclosed the production of organosilicon compositions in which the silicon atoms are linked by methylene radicals. Compositions of this type are considerably different in character from those which contain oxygen atoms linking the silicon atoms. In my application Serial No. 22,252 filed simultaneously herewith I have disclosed the production of difunctional organosilicon compositions in which the silicon atoms are linked by methylene radicals.

In accordance with the process of the present invention, organosilicon compositions of the type which contain both methylene radicals and oxygen atoms linking the silicon atoms are produced by the hydrolysis and condensation of the difunctional compounds above referred to in which the silicon atoms are linked by methylene radicals.

The compounds which are hydrolyzed in accordance herewith are of the type formula $YSiR_2(CH_2SiR_2)_nY$ wherein R represents hydrocarbon radicals, $n$ represents a positive integer and Y represents an alkoxyl radical or chlorine atom. The production of materials of this type is described in the above referred to specification. The hydrocarbon radicals represented by R include monocyclicaryl radicals, such as phenyl and tolyl and alkyl radicals such as methyl to octadecyl. By hydrolysis and condensation the compounds hereof are produced which have the general formula $$[SiR_2(CH_2SiR_2)_nO]_x$$

in which R has the indicated meaning, $n$ is a positive integer and $x$ is a positive integer equal to at least 2.

Upon hydrolysis of the described difunctional compounds hydrolyzates are obtained which are readily condensed. The hydrolyzates as produced would contain hydroxyl radicals linked to the terminal silicon atoms. These hydroxyl radicals are readily condensible to give siloxane linkages between these terminal radicals. In the chemistry of the siloxanes it is well known that the siloxane bond is relatively easily hydrolyzable. We have found that a siloxane bond which is positioned between two methylene bridges in the type of compound above indicated and produced in accordance with the method hereof is very stable in comparison to the siloxane bonds of the siloxanes heretofore known. Thus, these materials are stable in the presence of concentrated sulphuric acid. Sulphuric acid of 98% concentration at 90° C. has no effect upon these products. Fuming sulphuric acid at 90° C. effects polymerization to high molecular weight fluids. Inasmuch as these products of hydrolysis and condensation are excellent lubricants, the chemical stability noted illustrates that they are particularly useful as lubricants, hydraulic fluids, damping fluids and diffusion pump fluids in special situations where chemical stability is a factor.

The products produced by hydrolysis and condensation in accordance herewith are in general distillable fluids. By distillation, one may obtain a substantial yield of relatively low molecular weight cyclic materials. As for example, $[CH_2Si(CH_3)_2OSi(CH_3)_2]_x$ where $x$ has a low value as for example 2, 3, or 4. High molecular weight materials are likewise obtained. These high molecular weight materials may be higher cyclics or they may be linear materials in which the chain is terminated by hydroxyl radicals or the like.

Example 1

A mixture of 322 parts by weight of sodium and 1600 parts of toluene were heated to melt the sodium and were maintained at reflux temperature at atmospheric pressure. To this refluxing mixture there was added a mixture of 969.5 parts of $(CH_3)_2SiClOC_2H_5$ and 1062.5 parts of $ClCH_2Si(CH_3)_2OC_2H_5$. The rate of addition was regulated to maintain the reaction temperature at 105° to 115° C. The heat of reaction was removed by the coolant employed for refluxing. The product obtained by the interaction was filtered and then distilled, first to remove the toluene and then to separate the product into its components. By distillation at 20 mm. pressure there were obtained 408 parts of $$C_2H_5OSi(CH_3)_2CH_2Si(CH_3)_2OC_2H_5,$$

which was a 26.5 percent yield. This material has a boiling point of 77° to 83° C. at 20 mm. A 22 percent yield in amount of 229 parts of a product having the formula $C_2H_5OSi(CH_3)_2[CH_2Si(CH_3)_2]_2OC_2H_5$ was obtained. This material had a boiling point of 125°–130° C. at 20 mm. pressure. A residue of higher boiling materials was obtained which were of composition similar to that above indicated but in which the compounds had as many as 5 silicon atoms per molecule. These materials are indicated by plateaus in a distillation analysis, which plateaus are at 153° and 180° C.

A mixture of 190 parts of the above indicated compound which contained 2 silicon atoms together with 160 parts of 95% ethyl alcohol and 234 parts of concentrated hydrochloric acid was refluxed for 24 hours. A water insoluble layer rose to the top. This layer was separated and washed with water, dried, filtered and distilled. Upon distillation, 66.9 parts of a low molecular weight material and 33.1 parts of a higher molecular weight oil were obtained. Together these two represent a 78% yield. The low molecular weight material was $[(CH_3)_2SiCH_2Si(CH_3)_2O]_2$ This material had a density at 25° of 0.9042, a refractive index at 25° of 1.4328, a specific refraction of 0.2880, a viscosity of 3.12 centistokes and by analysis contained 38.55 percent silicon. The higher molecular weight material had a density of 25° C. of 0.9340, a refractive index at 25° C. of 1.4504, a specific refraction of 0.2882, a viscosity at 25° C. of 66 centistokes and by analysis contained 38 percent silicon. Hydrolysis and condensation of the higher molecular weight difunctional materials yields similar products which contain a higher proportion of methylene groups per oxygen linkage between silicons.

Example 2

A mixture of 75 grams of $C_2H_5O[Si(CH_3)_2CH_2]_2Si(CH_3)_2OC_2H_5$ 100 cc. of 90% ethanol—10% water and 100 cc. of 35% aqueous hydrochloric acid was refluxed for 14 hours. The reaction mixture was cooled. The salt formed was separated by filtration and the filtrate was distilled. 48 cc. of an oil were obtained which had a boiling point of 77° C. at 27 mm. This was found to be the cyclic compound $\{[Si(CH_3)_2CH_2]_2Si(CH_3)_2O\}_2$ At 25° C. it had an index of refraction of 1.4371 and a density of 0.872. An intermediate oil was obtained which boiled from 77° C. to 150° C. in amount of 8 cc. 8 cc. of a non-distilled residue were obtained. These latter two materials were higher cyclics.

Example 3

A mixture was made of 195 parts of toluene and 43.5 parts of molten sodium. A mixture of the following was added thereto, the components of the mixture being present in the amount indicated in parts by weight.

| Compound | Parts |
|---|---|
| $ClCH_2(CH_3)_2SiCl$ | 36 |
| $C_4H_9CH_3SiCl_2$ | 46 |
| $ClCH_2C_6H_5CH_3SiCl$ | 51 |
| $C_{18}H_{37}CH_3SiCl_2$ | 95 |

This mixture was added to the toluene-sodium mixture. The temperature was maintained at between 100 and 110° C. Following completion of the reaction, the reaction product was cooled, filtered, and stripped of toluene. The residue was fractionally distilled at 26 mm. pressure. The following cuts were obtained:

| No. | ml. | Boiling Range | $(n)_D^{25}$ |
|---|---|---|---|
| 1 | 11 | 83–140 | 1.4900 |
| 2 | 11 | 140–247 | 1.4926 |
| 3 | 11 | 247–249 | 1.4646 |
| 4 | 11 | 249 | 1.4658 |
| 5 | 11 | 247 | 1.4707 |
| 6 | 4 | 270 | 1.4765 |
| Residue | 47 | | 1.5116 |

The density of the residue was 0.9536. From the index of refraction and the density, the specific refraction is shown to be 0.3201. The theoretical value for this composition is 0.3255 which shows that the product is a copolymer of all of the materials employed.

The residue was a di-functional material having a hydrolyzable chlorine atom at each end of the molecule. This residue was hydrolyzed by reacting with water and the hydrolyzate was condensed. A viscous fluid was thereby obtained.

That which is claimed is:

1. Compounds of the formula $[SiR_2(CH_2SiR_2)_nO]_x$ in which R represents a radical of the group consisting of monocyclicaryl and alkyl, $n$ is a positive integer and $x$ is a positive integer of at least two.

2. $(CH_2SiR_2OSiR_2)_x$ in which R represents a radical of the group consisting of monocyclicaryl and alkyl and $x$ is a positive integer of at least two.

3. $[CH_2Si(CH_3)_2OSi(CH_3)_2]_x$ in which $x$ is a positive integer of at least two.

4. Compounds of the formula $[SiR_2(CH_2SiR_2)_nO]_x$ in which R represents a radical of the group consisting of monocyclicaryl and alkyl, $n$ has a value of from 1 to 2 and $x$ is a positive integer of at least two.

5. Compounds of the formula $[SiR_2(CH_2SiR_2)_nO]_2$ in which R represents a radical of the group consisting of monocyclicaryl and alkyl, and $n$ has a value of from 1 to 2.

6. The chemical compound 2,2,4,4,6,6,8,8-octamethyl-1,5-dioxa-2,4,6,8-tetrasilocane having the formula $$\begin{array}{c} (CH_3)_2Si-CH_2-Si(CH_3)_2 \\ | \quad\quad\quad\quad\quad\quad | \\ O \quad\quad\quad\quad\quad\quad O \\ | \quad\quad\quad\quad\quad\quad | \\ (CH_3)_2SiCH_2-Si(CH_3)_2 \end{array}$$

JOHN T. GOODWIN, JR.

REFERENCES CITED

The following references are of record in the file of this patent:

UNITED STATES PATENTS

| Number | Name | Date |
|---|---|---|
| 2,352,974 | Rochow | July 4, 1944 |

OTHER REFERENCES

Rochow, "Introduction to the Chemistry of the Silicons" (1946), pages 46–49 Wiley and Sons, publishers.

Goodwin, "Jour. Amer. Chem. Soc.," vol. 69 (September 1947), page 2247.